United States Patent [19]
Ford

[11] 3,985,033
[45] Oct. 12, 1976

[54] APPARATUS FOR ERECTING A TRUE VERTICAL AXIS

[75] Inventor: John Randolph Ford, Narberth, Pa.

[73] Assignee: RCA Corporation, New York, N.Y.

[22] Filed: May 15, 1952

[21] Appl. No.: 288,081

[52] U.S. Cl. .................................... 73/505; 33/366
[51] Int. Cl.² ................... G01C 9/06; G01P 15/00
[58] Field of Search ................ 318/19, 489; 33/204, 33/206, 215, 366; 244/79, 77; 74/5 T; 264/1; 73/505

[56] References Cited
UNITED STATES PATENTS

| | | | |
|---|---|---|---|
| 2,073,394 | 3/1937 | MacMillan | 264/17 |
| 2,109,283 | 2/1938 | Baykaw | 244/14 |
| 2,266,449 | 12/1941 | Ullrich | 235/61 |
| 2,605,093 | 7/1952 | Dorand | 264/1 AG |
| 2,638,556 | 5/1953 | Hausz | 264/1 |
| 2,648,655 | 8/1953 | Smith | 264/1 |
| 2,666,199 | 1/1954 | Rothschild | 343/117 |

FOREIGN PATENTS OR APPLICATIONS
33,746   10/1934   Netherlands ......................... 318/19

*Primary Examiner*—M. F. Hubler
*Attorney, Agent, or Firm*—Edward J. Norton

EXEMPLARY CLAIM

1. Apparatus for deriving an electrical signal comprising, means for initially positioning a body along an axis including means for supporting said body so that said body is free to tilt and thereby depart from a position along said axis, means for rotating said body about said axis at a constant rotational velocity, thereby causing the body to exert a centrifugal force in a rotating radial line normal to said axis, and means responsive to variations in the force of said body along the said radial line of centrifugal force resulting from departure of said body from said position on said axis to provide an electrical signal with a periodicity equal to that of said rotation and variable in accordance with said force variations.

13 Claims, 7 Drawing Figures

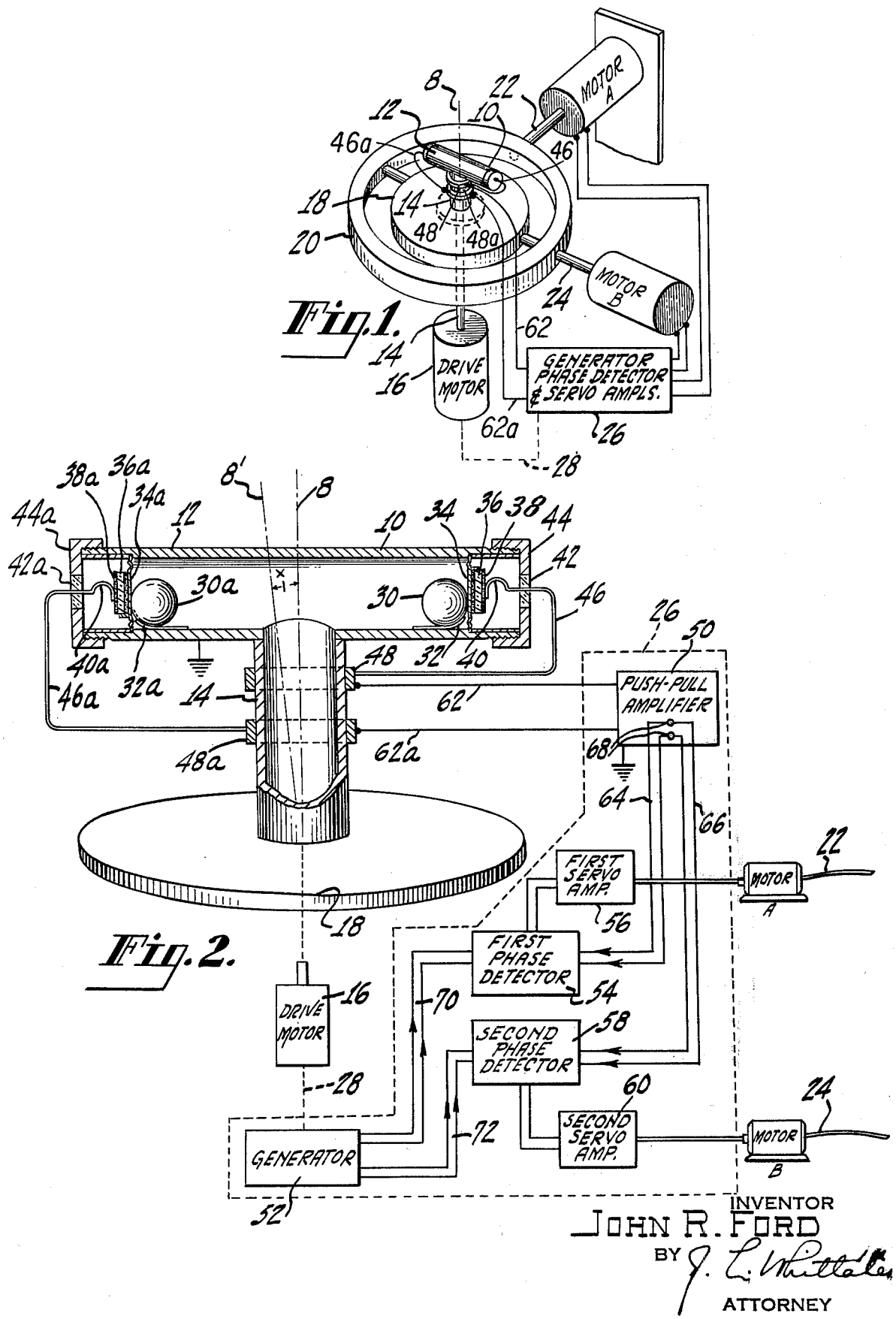

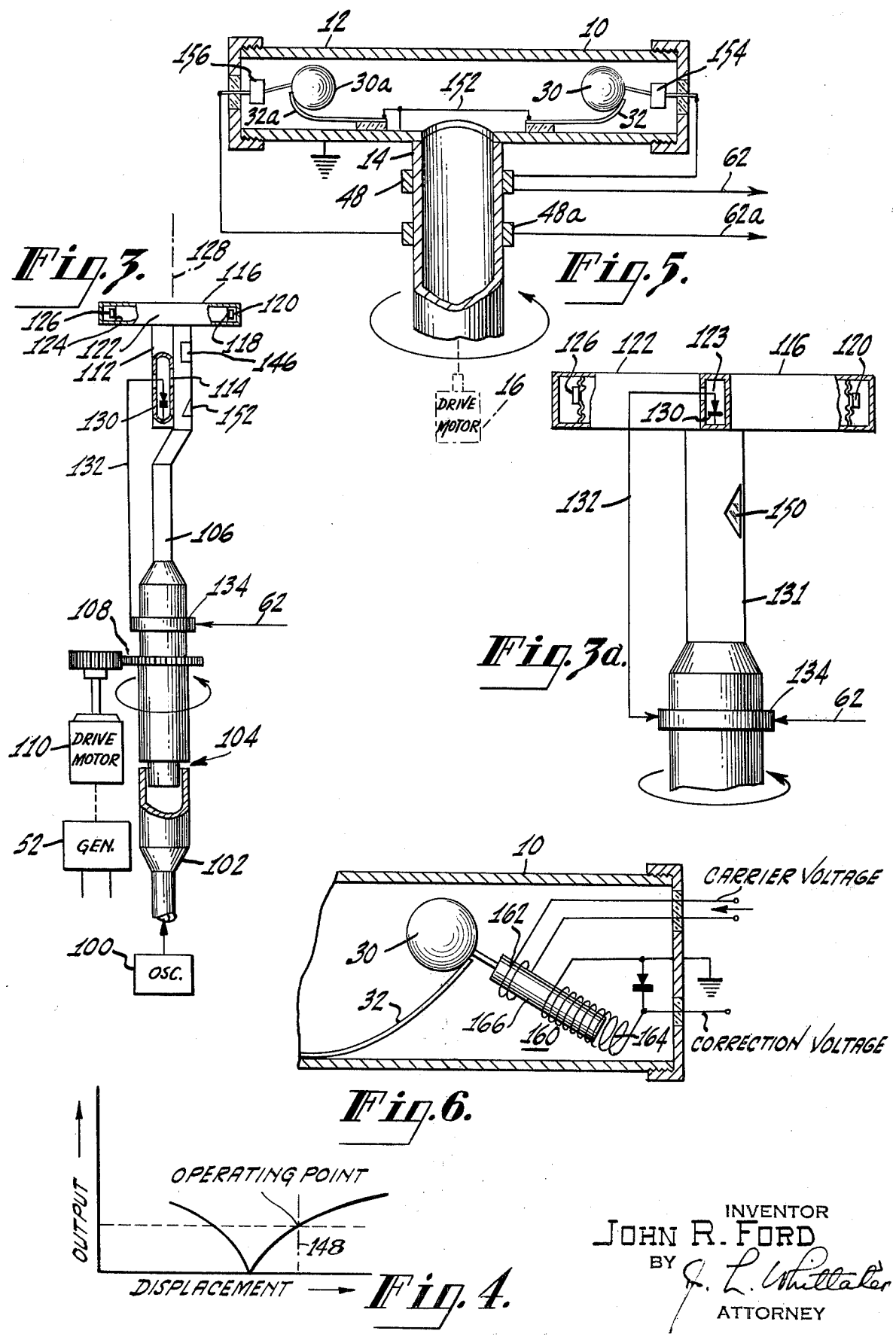

APPARATUS FOR ERECTING A TRUE VERTICAL AXIS

The Government has rights in this invention pursuant to Contract DA-36-034-ORD-113 awarded by the Department of the Army.

The present invention is related to a stable platform or to the erection of a true vertical axis.

The problem of maintaining a stable platform frequently arises in various instances, for example, in the navigation of, and fire control from, aircraft or water craft. The usual solution to this problem is by using a gyroscope or a gyroscopic control which maintains a desired orientation of the platform, regardless of motions of the craft. Another solution is to employ a pendulum. As the pendulum returns to its position of stability, and electrical signal may be developed for controlling the orientation of the platform with respect to the pendulum. Each of these means for maintaining a stable platform are subject to disadvantages. Gyroscopic controls are generally complicated, expensive, and require high accuracy of mechanical work. The pendulum type controls are subject to disadvantages due to the pendulum inertia, and due to the natural periodicity of the pendulum which prevents its settling promptly to a true vertical.

It is an object of the invention to provide a novel means and method for erecting and maintaining a true vertical axis.

It is another object of the invention to provide an means for maintaining a platform stable with respect to the vertical A further object of the invention is to provide for the erection of a vertical axis and the stabilization of a platform with respect thereto which are inexpensive and yet highly accurate.

The present invention affords a novel means for deriving and electrical signal when the axis of rotation of a body departs from the vertical. In accordance with the present invention an arm is rotated about an axis to be maintained vertical. The arm is mounted on a platform, the orientation of which is to be stabilised with respect to the vertical. The arm contains a body which is subject to centrifugal force due to the rotation. Means responsive to this force are provided so that if the rotation of the body is in a true horizontal plane, no signal or a fixed signal is developed. If, however, the rotation of the body about the axis is not in a true horizontal plane, an alternating electric signal, which may be termed a correction signal, is developed due to the variation in the pressure exerted against the element.

The responsive means may include an element such as a piezoelectric crystal mounted against a diaphragm to receive on one face the radial forces developed by the body, and produce a voltage responsive to the pressure variations. However, strain gauges, simple diaphragms in conjunction with the reflection of high frequency energy to give phase modulation, or variable inductive coupling to give carrier voltage amplitude modulation responsive to the radial force variation may be employed. In the case of the element, if the element is on the side of the body remote from the axis, then the pressure will be maximum at the lowest point of travel because of the addition of gravitational force, and minimum at the highest point of travel because of the pull of gravitation. Accordingly, it is apparent that the correction signal has a periodicity equal to the periodicity of rotation of the arm. By comparing the correction signal thus developed with alternating signals of the same periodicity generated, for example, by a reference voltage generator driven by the same shaft as that which rotates the arm, error signals may be developed. Such error signals may then control servo mechanisms to correct the position of the platform and reorient the axis of rotation to the vertical from which it has departed. For example, such error signals may be developed by comparing in a pair of phase detectors the correction signal respectively with reference voltages 90° out of phase with each other, thereby providing two error signals for two servo mechanisms which respectively turn the platform about mutually perpendicular axes normal to the axis of rotation.

A further feature of the invention resides in employing a plurality, for a specific example, a pair of arms. The pair of arms may be on opposite sides of the axis each arm having its own body and pressure sensitive element. The correction signal is obtained by subtracting the signals from each arm to derive a pushpull signal which is relatively insensitive to fluctuation in the rotational rate. As the signals in each arm are 180° out of phase with the other, the signals, are subtracted regard being had for sign, but are algebraically added, the total signal being the algebraic sum of the signals from each arm.

The foregoing objects and other objects, advantages, and novel features of the invention will be more apparent from the following description when taken in connection with the accompanying drawing, in which like references refer to the like parts, and in which:

FIG. 1 is a simplified perspective view of one embodiment of the invention;

FIG. 2 is a schematic diagram showing the electrical circuits of the apparatus of FIG. 1.

FIG. 3 is a simplified schematic drawing of an embodiment of the invention employing ultra-high frequency techniques;

FIG. 3a is a schematic view of a coupler which may, if desired, be employed in the place of a slot coupler of FIG. 3;

FIG. 4 is a graph useful in explaining the operation of the embodiment of FIG. 3;

FIG. 5 is a schematic view, partially in cross-section, of an embodiment employing strain gauges or electronic gauges; and FIG. 6 is a partial cross-sectional schematic view of still another embodiment of the invention illustrating the employment of carrier voltages which may be below the ultra-high frequency range.

Referring to FIG. 1, a pair of arms 10 and 12 are mounted for rotation about an axis 8 on the shaft 14 of a drive motor 16. Although shown somewhat schematically, it will be understood that the drive motor and shaft are mounted on the platform 18 which is to be stabilized. The platform 18 is encircled by a ring 20 supported on and rotatable about the shaft 22 of a motor. A. A motor B has its shaft 24 journaled in the ring 20 and supporting the platform 18 for rotation with the shaft 24 of motor B. The axes of rotation of shafts 22 and 24 are at right angles and preferably intersect at a point on the axis of the drive motor shaft 14. A generator, phase detectors, and servo amplifiers are indicated in a block 16 with a mechanical connection 28 from the drive motor.

Greater detail of the arrangement of FIG. 1 is shown in FIG. 2. A body 30, preferably having appreciable mass, is attached to arm 10 by attachment to a light spring 32. The body 30 bears against a diaphragm 34. A piezoelectric crystal 36 has one face bearing against the diaphragm 34 and another face, on which is deposited by sputtering or the like a suitable electrode 38. The diaphragm 34 itself may serve as one crystal electrode. It may be considered as grounded to the metallic structure of the arm 10 and shaft 14. A terminal 40 makes contact with the electrode 38. The terminal 40 is preferably quite stiff and is supported in a dielectric plug 42 through an end cap 44 which is threaded to be applied to the end of the arm 10. A lead 46 is brought out from the terminal 40 and connected to a slip ring 48. The lead 46, if suitably insulated, may be brought to the slip ring 48 internally of the arm, or attached to it to prevent its being thrown or twisted by the motion of the arm and shaft, but is illustrated as shown for the sake of clarity.

The generator, phase detectors, and servo amplifiers in block 26 of FIG. 1 are shown as blocks in FIG. 2. These may include an amplifier 50, a generator 52, a first phase detector 54, a first servo amplifier 56, a second phase detector 58, and a second servo amplifier 60. In the illustration a d-c servo motor having permanent magnet fields may be used together with servo amplifiers deriving suitable d-c control voltages to control the motors from the signals from the elements in the arms may be used, if desired. However, the system described in greater detail hereinafter is presently preferred. A lead 62 has a suitable contact to pick up signals from the slip ring 48 and apply these signals to the input of amplifier 50.

The elements associated with the arm 12 corresponding to those in arm 10 are indicated by like reference numerals followed by the postscript a. The lead 46a brings the voltages generated at the crystal contact 40a to the slip ring 48a. The lead 62a applies the signal from slip ring 48a to the amplifier input of amplifier 50.

In considering the operation of the device of FIGS. 1 and 2, assume the drive motor 16 to rotate the arms 10 and 12 at some constant angular velocity about the axis 8. Assume also, for the moment, that the axis 8 departs from the vertical but remains in the plane of the paper as viewed in FIG. 2. To be specific, assume the axis 8 to be tipped slightly to the left, to assume a position such as 8'. Under these assumptions, it is apparent, first of all, that the body 30 is subject to a constant centrifugal force directed along or in a radial line normal to the axis of rotation. This radial line is the line passing through the center of mass of the body 30 and normal to and intersecting the axis 8. However, as the body 30 reaches its extreme right-hand position, (as viewed in FIG. 2) the component of force of gravity normal to the pressure element acts in opposition to the centrifugal force. As the body 30 reaches the extreme left-hand position, opposite to the extreme right-hand position, the component of the force of gravity normal to the pressure element aids the centrifugal force. It is apparent that the component of the force of gravity resolved along the rotating radial line passing through the body 30 and normal to the axis 8, varies substantially proportional to the sin $\omega t$, where $\omega$ is the angular velocity of rotation and t is the time. Moreover, the phase of this component of gravitational force is zero in the plane normal to the plane of the extreme right and left-hand positions (that is, normal to the plane of the view of FIG. 2) of the body 30 mentioned above. The zero phase plane may be considered as the plane through axis 8 and the axis of shaft 22 as viewed in FIG. 1. If the direction of force aiding the centrifugal force (radially outwards) be taken as positive, then time t may be taken as starting at $t=0$ when the position of the arm is nearest the observer in the zero reference plane through axis 8 normal to the plane of the drawing of FIG. 2, if the direction of rotation is clockwise looking down on axis 8.

These variations in this radial force cause a varying electric charge to be generated on the opposite faces of the crystal 36, because the force is applied against the diaphragm 34, which yields in response thereto, and thus to one crystal face. But the opposite crystal face is preferably held in a comparatively unyielding manner by the contact 40, so that the crystal is compressed in response to the force variations. Therefore, the crystal 36 which is a pressure responsive element, and the mass 30 in the arm 10' are means for deriving an electric signal in response to these force variations proportional to sin $\omega t$. The spring 32 is preferably light, and its purpose is to maintain the body 30 in place when the device is not in operation, and prevent the body 30 from moving about violently or with unnecessary motion in the arm 10. The spring 32 also prevents random circumferential motion of the body 30.

From an analysis similar to the foregoing, it is readily apparent that a like signal is derived from the other crystal contact 38a, having a phase opposite the phase of the signal on contact 40, assuming the crystals to be faced in the desired manner, with corresponding faces in contact with the electrodes 38 and 38a. Hence the electrical signal variations on lead 62a from slip ring 48a are proportional to $-\sin \omega t$, whereas those on lead 62 are proportional to sin $\omega t$. Moreover, the amplitude of these signals is proportional to the sin $x$ of the angle X between the vertical and the displaced positions (between 8 and 8' in this case) of the axis 8. Since for small angles sin $x$ is approximately equal to X, the difference in potentials between the leads 62 and 62a is proportional to 2 X sin $\omega t$.

Therefore the signals applied to the input of amplifier 50 by leads 62 and 62a are push-pull. Each lead 62 and 62a may be connected, for example, to opposite terminals of the primary winding of an input transformer (not shown) or may be otherwise suitably applied to amplifier 50. The amplified signal output from amplifier 50 is taken from a pair of output terminals 68 and applied by suitable connections 64 and 66 respectively to first and second phase detectors 54 and 58.

The generator 52 actually has two output voltages of the same frequency as the frequency of revolution of the shaft 14, and thus synchronized with the body rotation frequency. The generator 52 may be considered as two generators, as there are two output voltages. One generator voltage is phased 90° from the other generator voltage. One is applied by a connection 70 as a reference voltage to the first phase detector 54 and the other by a connection 72 as a reference voltage to the second phase detector 58.

Any of many known phase detectors may be employed for detectors 54 and 58. An example of a generator 52 and phase detectors 54 and 58 suitable for employment in the device of FIGS. 1 and 2 are those of the radar (radio echo detection and ranging) set known as the SCR 584 (a U.S. Army designation) used in the antenna positioning circuits of that set. The phase detectors used in this set are of a commutating type. Briefly, as in the SCR 584 arrangement, the reference voltage on connection 70 may be adjusted to provide an error signal to which the servo motor A is responsive. Two double triodes are provided as commutator tubes, each having first and second sections. Each double triode has its grids driven in push-pull by the error signal. One double triode has a common cathode resistor for its cathodes, as also does the other double triode. Cathode resistors are joined and may be grounded at their junction. Each double triode has its anodes driven in push-pull by one reference voltage from the reference generator which is first squared. The connections are such that when one double triode grid voltages are in phase with the anode voltages, the other double triode grid voltages are out of phase with its anode voltages. It is readily shown that for voltages and the grids in-phase or 180° out-of-phase with the error voltage, one or the other cathode resistor has more current through it than the other, but for voltages on the triode grids phased 90° from the one reference voltage, the voltages across the cathode resistors are balanced. The differential voltage across the two cathode resistors is filtered, amplified, and used to control the direction and magnitude of current driving a motor. This differential voltage has sensing, the voltage across one resistor being greater than that across the other and vice-versa according to whether there is a component in-phase or out-of-phase with the reference voltage on the grid of one of the double triodes. The first phase detector 54 output (the differential voltage mentioned) is used as an error voltage for the first servo amplifier 56 and motor A. In the SCR 584 circuit the servo amplifier 56 takes the form of a d-c amplifier including an amplidyne. Motor A is a d-c motor receiving the current output of the amplidyne.

The arrangement of phase detector 58 and servo amplifier 60 may be similar to that of phase detector 54 and servo amplifier 56. The servo amplifier 60 controls motor B which brings the axis 8 into a vertical plane normal to the first vertical reference plane. It is apparent that the action of the two servo loops is to erect the axis 8 into the vertical. The amplifiers 56 and 60 and the motors A and B may also take the forms of the d-c amplifiers (including amplidynes) and motors used for antenna positioning in the SCR 584. Anti-hunt and other auxiliary circuits may be provided similarly if desired.

It will be apparent to those skilled in the art that other suitable phase detector amplifier and motor arrangements than the one here specifically discussed may be employed. The choice of components may well depend on the frequencies involved, the load to be positioned, and the other factors of an engineering nature. For example, motor A may be a two-phase motor. It should, therefore, be understood that the connections shown, especially to the motors A and B, are purely schematic, as mentioned above, and not intended to show in detail all of the various wires and connections which might be employed in any practical case. Such connections and wiring will, however, be well understood by those skilled in the servo or electrical motor arts.

FIG. 3 illustrates another means responsive to variations in the force of a body in a rotating arm along the radial line of the arm to provide an electrical signal variable in accordance with these force variations. An oscillator 100 of very high frequency supplies energy to a rectangular waveguide 102. The waveguide 102 is connected through a transition to circular waveguide to a rotating joint element 104. The rotating joint is connected by a transition back to rectangular waveguide to a second rotatable rectangular waveguide 106. The rotatable joint and transitions are known and are only schematically indicated. The rotatable waveguide may be turned by means of gearing 108 from a motor 110 operated by any suitable power source. The rotatable waveguide 106 is coupled to another waveguide 112 through a directional coupler arrangement which may comprise a long slot coupler 114 in a wall portion common to the waveguides 106 and 112. At the ends of waveguides 106 and 112 remote from the oscillator, these waveguides each have an arm. The arm 116 of waveguide 106 has at its outer end a diaphragm 118 to which is connected a weight 120. Similarly, waveguide 112 has an arm 122 at the outer end of which is a diaphragm 124 to which is attached a weight 126. The waveguides 106, 112 and the arms 116 and 122 all rotate together about an axis which is to be made vertical. At the end of waveguide 112 remote from the outer end of the arm 122 and beyond the coupling slot 114 is a crystal diode 130 with a suitable connection 132 leading to a slip ring 134. Voltage is taken off the slip ring and is applied to the amplifier 50 of FIG. 2 through lead 62. Lead 62a is grounded. The generator 52 is driven by motor 110. The rest of the apparatus, including motors A and B, the servo amplifier and platform may be as in FIGS. 1 and 2. A grid resistor (not shown) at the input of amplifier as load resistor for crystal diode 130.

In operation, as the arms are rotated the weight of the bodies 120 and 126 cause the diaphragms 118 and 124 to be modulated in their radial distance from the axis. If the rotation is at a constant speed, such modulation will depend upon the departure of the axis 128 from the vertical. If the axis 128 is vertical, there will be no modulation. In a condition of modulation the energy returned by reflection from diaphragm 118 which terminates the wave guiding channel in the arm 116 is at least partially coupled into waveguide 112 by the directional coupler 114. Preferably, the coupler couples one-half the energy from one waveguide to the other. This last-mentioned energy reflected from diaphragm 118 travels toward the crystal 130. Similarly, energy returned by reflection fron diaphragm 124 is partially coupled into waveguide 106, but a considerable portion of it will continue through waveguide 112 to the crystal 130. The crystal 130, therefore, receives two components of energy. If a suitable phase delay is inserted in one of the waveguides between the coupling 114 and the diaphragm 118, such as the variable phase delay element 146, it is clear that these two components of energy may be made to have a certain phase condition resulting in the crystal 130 rectifying a certain voltage under no modulation conditions. The variable attenuator, indicated at 152, may be adjusted for best performance, and to prevent too much energy being sent back to the generator, or overloading the crystal. If modulation occurs, however, then this resultant rectified current will vary in accordance with the rotational frequency.

The arrangement shown, may provide sensing in a manner which may be explained by consideration of FIG. 4. FIG. 4 shows what may be called a curve of voltage versus displacement of the diaphragms 118, 124 along the axis of the arms normal to the rotational axis and in the same direction together. Such displacement is plotted along the X axis and the output from the crystal is plotted along the Y axis. An operating point is indicated by the intersection of a line 148 with the curve. In theory, the components at crystal 130 due to reflection from the arms should have a 90° phase relationship, for the best operating point. Therefore, phase shifter 146 should provide an eighth (or small odd integral eighth) wavelength phase shift. Alternatively, one of the arms may be made one eighth wavelength longer than the other (to the effective reflecting point). It is easily shown vectorially that the crystal provides then an a-c output, the amplitude and phase of which depend respectively on the angle of departure of the axis from the vertical and on the radial plane in which the axis is tipped. The alternating output voltage from the crystal may be compared with the generator voltages as described in connection with FIGS. 1 and 2 to develope error voltages with sensing. Note that the advantages of push-pull circuits in eliminating the effect of variations in rotational rate have been achieved with a single ended output. This output may be amplified and then fed to lines 64 and 66 of FIG. 1.

Instead of the coupler of FIG. 3, one may use the magic T coupling arrangement of FIG. 3a. The waveguide 131 may be rectangular, with a suitable transition from the rotation joint to rectangular waveguide 131. The waveguide 131 is one arm of the magic T. Waveguide arms 116 and 122 are a pair of rectangular arms of the magic T. The waveguide arm 123 is the other arm of the magic T and is paired with arm 131. The magic T is matched so that all the energy from arm 131 divides between the other pair of arms 116 and 122. By suitable proportioning of the lengths of arms 116 and 122, the energy reflected from each of these arms is divided into arms 123 and 131, preferably in 90° phase relationship. This may be accomplished by making, for example, arm 116 one eighth (or a small odd multiple of an eighth) wavelength longer at the mid operating frequency than its paired arm 122, or by using a phasing element (not shown) in one arm. The crystal 130 is positioned in the arm 123 of the magic T. Suitable counterbalancing (not shown) may be provided. For convenience of illustration, slip ring 134 is shown on the rectangular guide although it may also be located before the transition in either FIG. 3 or 3a.

In operation of the arrangement of FIG. 3a the energy enters arm 131 travelling toward the magic T. There it divides into and is reflected at the ends of arms 116 and 122. On its return to the magic T, the energy in 90° relation travels in arm 123 and a portion returns into arm 131. The crystal in arm 131 then acts to provide an a-c voltage of frequency equal to the rotational frequency of the arms by rectifying the high frequency energy reflected from arms 116 and 122. However, the relative phase of the a-c voltage depends on the precise phase relationship of the energies reflected by the arm terminations at the weights or objects 120 and 126. When the axis of rotation is not vertical, one component of energy at the crystal, say that from arm 116 is at one arm position lagging due to the gravitational pull. The other component at this time, from arm 122, is leading. A converse action occurs when the arm positions are reversed 180° in position. Accordingly, it is readily shown vectorially that the action of the crystal provides an a-c voltage responsive to the departure of the axis from the vertical. This voltage may be used as before, to correct the axis position and return it to the vertical, stabilizing the platform. The attenuator 150 serves the same purpose as before, to prevent too strong reflections back to the source. It will be appreciated by those skilled in the art that coupler arrangements may be used other than the directional slot coupler of FIG. 3 or the magic T coupler of FIG. 3a. Also, the similarity in operation of the arrangement of FIG. 3 or 3a will be understood by those skilled in the art.

Another embodiment of the invention is illustrated in FIG. 5. The arms 10, 12 have an arrangement of bodies 30 and 30a similar to that shown in FIG. 2. However, the springs 32 and 32a are insulated from the arms 10, 12 and shaft 14 and electrically connected by a lead 152 which is grounded to the body of the arms or shaft. The bodies 30, 30a are connected respectively to strain gauges 154 and 156 respectively. One end of the strain gauge is connected to the bodies 30 and 30a and the other end is insulated from but mechanically attached to the arms 10, 12 respectively. With this arrangement the voltages developed by the strain gauges are brought out to slip rings 48, 48a in the proper polarities to give a push-pull signal on the leads 62 and 62a. It is apparent that the remainder of the apparatus may be as illustrated in FIG. 2. The strain gauges may be replaced, if desired, by RCA electronic gauges in which the change of position or force exerted by the bodies would cause a change of vacuum tube electrode spacing from which a signal could readily be obtained. This would require the application of suitable voltages to the electrodes. Means for developing such voltages and applying them are not here shown.

The lead from the strain gauge to the slip ring 48a may be omitted and the slip ring 48a may be omitted. Also the ground connection from lead 152 may be omitted.

In this event, a single-ended output or control voltage may be picked up from lead 62 and used as desired. By this means, the output on lead 62 is doubled in amplitude but the effect of a push-pull output is lost. Also, it will be noted that a suitable connection to ground then must be made between the terminals of strain gauge 156 remote from the body 30a to ground.

Another alternative is illustrated in FIG. 6 in which is shown only the arm 10 and the body 30 with the retaining or attaching spring 32, the remainder of the apparatus being omitted as unnecessary in view of what has been heretofore said. In this case, a carrier voltage of a frequency preferably at least several times higher than the rotational frequency of the shaft 14 is applied to a transformer arrangement 160. The carrier voltage is applied to a primary winding 162. The secondary winding 164 is coupled to the primary winding 162 through a core 166 which is attached to the body 30 and movable with the body 30. The windings 162, 164 are fixed to the arm 10.

As more or less radial forces are applied to the body 30 the core 166 will be inserted to a greater or less degree into the secondary winding 164. The coupling to the winding 164 will accordingly be increased or decreased. Therefore, the induced output voltage from the secondary winding 164 will vary in amplitude with a periodicity equal to that of the rotation and in accordance to the radial forces exerted by the body 30. A detector may then be employed to derive a signal by demodulation of the amplitude modulated carrier voltage from the secondary winding 164. The carrier voltage may be applied through suitable slip ring arrangements (not shown) or the induced output voltage may, if desired, be detected immediately even within the arm 10 by a suitably mounted crystal detector arrangement, as shown. The correction voltage thus developed may be taken off by a slip ring such as 48. If desired, an oppositely poled voltage may be secured by a similar arrangement (not shown) in the arm 12 and taken off by a slip ring such as 48a. Thus a push-pull correction voltage may be readily secured.

In view of the foregoing it will be apparent that the invention provides a novel means and method for deriving correction voltages which may be converted into error signals for operating servo mechanisms to maintain a stable platform and a true vertical axis.

What is claimed is:

1. Apparatus for deriving an electrical signal comprising, means for initially positioning a body along an axis including means for supporting said body so that said body is free to tilt and thereby depart from a position along said axis, means for rotating said body about said axis at a constant rotational velocity, thereby causing the body to exert a centrifugal force in a rotating radial line normal to said axis, and means responsive to variations in the force of said body along the said radial line of centrifugal force resulting from departure of said body from said position on said axis to provide an electrical signal with a periodicity equal to that of said rotation and variable in accordance with said force variations.

2. Apparatus for deriving an electrical signal comprising, means for initially positioning a body along an axis including means for supporting said body so that said body is free to tilt and thereby depart from a position along said axis, means for rotating said body about said axis at a substantially constant rotational velocity, thereby causing the body to exert a centrifugal force in a rotating radial line normal to said axis, and means responsive to variations in the force of said body along the said radial line of centrifugal force resulting from departure of said body from said position on said axis to provide an electrical signal with a periodicity equal to that of said rotation and variable in accordance with said force variations.

3. Apparatus for deriving an electrical signal in accordance with the departure of the axis of a shaft from the vertical comprising, a rotatable shaft, means for initially positioning a body along an axis including means for supporting said body so that said body is free to tilt and thereby depart from a position along said axis, an arm on said shaft, a body attached to said arm, means for rotating said shaft, said arm, and said body at a constant rotational velocity so that said body exerts a centrifugal force in a rotating radial line normal to said axis, and means responsive to variations in the force of said body along the said radial line of centrifugal force resulting from departure of the axis of said shaft from the vertical to provide an electrical signal with a periodicity equal to that of the rotation and variable with said force variations, whereby said signal is variable in accordance with departures of said axis from the vertical.

4. Apparatus for deriving an electrical signal in accordance with the departure of an axis from the vertical comprising, an arm rotatable about an axis, initially aligned with the vertical and free to tilt and thereby depart therefrom a body attached to said arm and rotatable therewith, means for rotating said arm and body at a constant rotational velocity so that said body exerts a centrifugal force in a rotating radial line normal to said axis, and means responsive to variations in the force of said body along the said radial line of centrifugal force resulting from departure of said axis from the vertical to provide an electrical signal with a periodicity equal to that of said rotation and variable with said force variations, whereby said signal is variable in accordance with departures of said axis from the vertical.

5. The apparatus claimed in claim 4, said means including a piezoelectric crystal.

6. The apparatus claimed in claim 4, said means including a waveguiding channel in said arm, and a reflective diaphragm terminating said channel and attached to said body.

7. The apparatus claimed in claim 4, said means including a strain gauge.

8. The apparatus claimed in claim 4, said means including a transformer having a coupling means attached to said body.

9. Apparatus for deriving an electrical signal in accordance with the departure of an axis from the vertical comprising, means for initially positioning a body along an axis including means for supporting said body so that said body is free to tilt and thereby depart from a position along said axis, means for rotating said body about said axis at a constant rotational velocity, thereby causing the body to exert a centrifugal force in a rotating radial line normal to said axis, means responsive to variations in the force of said body along the said radial line of centrifugal force resulting from departure of the axis of said body from the vertical to provide an electrical signal, and means connected to receive said signal and responsive thereto for re-orienting said axis of rotation.

10. Apparatus for maintaining a true vertical comprising, means for initially positioning a body along an axis including means for supporting said body so that said body is free to tilt and thereby depart from a position along said axis, means for rotating a body about an axis at a constant rotational velocity, thereby causing the body to exert a centrifugal force in a rotating radial line normal to said axis, means responsive to variations in the force of said body along the said radial line of centrifugal force resulting from departure of the axis of said body from the vertical to provide an electrical correction signal with a periodicity equal to that of the rotation and variable in accordance with said force variations, whereby said signal is variable in accordance with departures of said axis from the vertical, means for rotation of said axis about a second axis normal to said first axis, means for rotation of said axis about a third axis normal to each of the other two, each of the last two named means including a servo mechanism responsive to an error voltage, voltage generator means supplying a pair of reference voltages each synchronized with the said body rotation frequency and each reference voltage phased 90° from the other, a pair of phase detector means to one of which is applied the said correction signal and one reference voltage and to the other of which is applied the said correction signal and the other reference voltage, each said phase detector having as output a voltage, one said output voltage being applied as an error voltage to one and the other output voltage applied as an error voltage to the other of said servo mechanisms, whereby the said axis of rotation is maintained vertical.

11. The apparatus claimed in claim 10, said means for rotating said body comprising a shaft mounted on a platform, an arm attached to said shaft, and a drive motor to drive said shaft, said body being attached to said arm.

12. The apparatus claimed in claim 11, said shaft being mounted for rotation on a platform, said means for rotation of said first axis about the second comprising a ring in which is journaled a second shaft on which said platform is mounted for rotation with said second shaft, said means for rotation of said first axis about said third axis comprising a third shaft at right angles to said first and on which third shaft said ring is mounted for rotation therewith.

13. The apparatus claimed in claim 12, one said servo mechanism mechanically actuating said second shaft and the other said third shaft each in response to its respective error signal.

* * * * *

UNITED STATES PATENT OFFICE
CERTIFICATE OF CORRECTION

PATENT NO. : 3,985,033

DATED : October 12, 1976

INVENTOR(S) : John Randolph Ford

It is certified that error appears in the above-identified patent and that said Letters Patent are hereby corrected as shown below:

Column 1, line 18, change "and" to --an--, line 31, change "an" to --novel--, line 39, change "and" to -- an --.

Column 2, line 67, change "16" to --26--,

Column 6, line 21, after "axis" insert --128--, line 31, after "amplifier" insert --50 may serve--.

Signed and Sealed this twelfth Day of July 1977

[SEAL]

Attest:

RUTH C. MASON
*Attesting Officer*

C. MARSHALL DANN
*Commissioner of Patents and Trademarks*